United States Patent [19]
Parone

[11] 4,083,643
[45] Apr. 11, 1978

[54] ROUGHING CUTTER

[75] Inventor: Anthony D. Parone, Elmwood, Conn.

[73] Assignee: Colt Industries Operating Corporation, West Hartford, Conn.

[21] Appl. No.: 797,582

[22] Filed: May 16, 1977

[51] Int. Cl.² ............................................. B26D 1/12
[52] U.S. Cl. .................... 407/59; 76/101 A
[58] Field of Search ........................ 407/53, 54, 56, 58, 407/59, 60, 61; 76/101 A

[56] References Cited

U.S. PATENT DOCUMENTS

| | | | |
|---|---|---|---|
| 1,432,579 | 10/1922 | Vavclain | 407/59 |
| 2,396,289 | 3/1946 | Ross | 407/59 |
| 3,548,476 | 12/1970 | Cave et al. | 407/59 |
| 3,574,251 | 4/1971 | Corti | 407/59 |
| 3,736,634 | 6/1973 | Sonnie | 407/59 |
| 4,050,128 | 9/1977 | Lange | 407/59 |

*Primary Examiner*—Harrison L. Hinson
*Attorney, Agent, or Firm*—Radford W. Luther; Richard A. Dornon

[57] ABSTRACT

A roughing cutter has a generally cylindrical shank with a plurality of lands and angular flutes separating the lands. A plurality of straight-crested cutting teeth are formed on the lands with radial relief. Each tooth has a straight cutting edge generally perpendicular to the radial direction. The orientation of the cutting edge permits it to be in parallel relationship to a surface of a workpiece while in cutting engagement. This results in a smoother finish than would otherwise be possible. The teeth of the roughing cutter may be cut by an axially advancing milling cutter with a sloping cutting edge.

2 Claims, 10 Drawing Figures

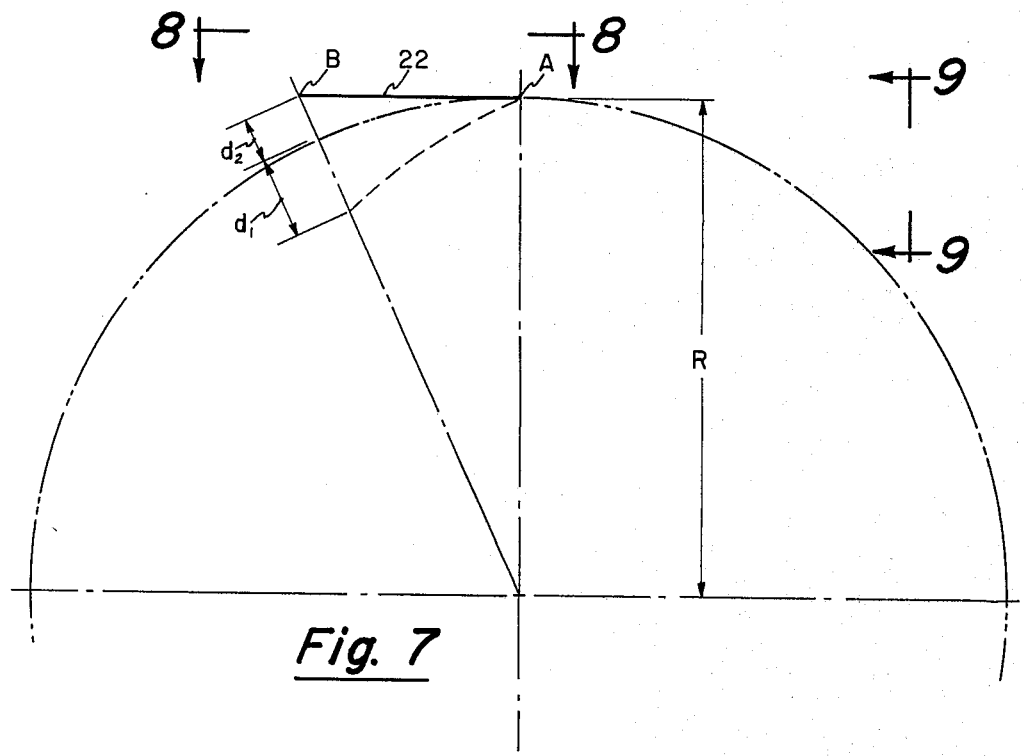
Fig. 7
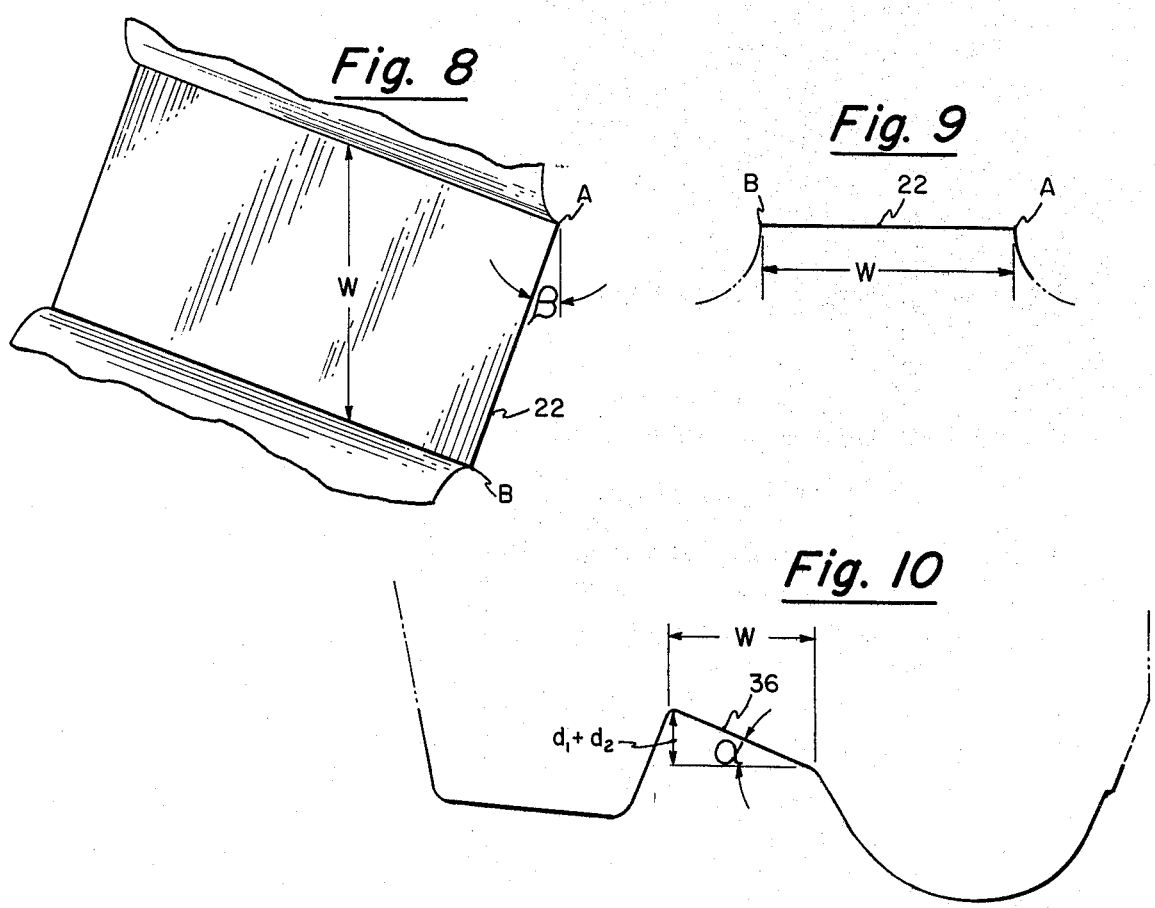
Fig. 8
Fig. 9
Fig. 10

ROUGHING CUTTER

BACKGROUND OF THE INVENTION

This invention relates to roughing cutters and more particularly to the geometry of the teeth thereof.

Standard roughing cutters do not produce smooth surface finishes. As a result, a tool change is usually necessary to provide the desired surface finish.

SUMMARY OF THE INVENTION

The invention provides a roughing cutter which allows for stock removal with a relatively smooth surface finish. Hence, a tool of the invention may obviate a tool change, thereby resulting in time saving.

A roughing cutter of the invention employs straight-crested, radially relieved teeth, which are known in the prior art to furnish smooth surface finishes in certain tools. Since the flutes in roughing cutters are angular (helical or spiral), conventional straight-crested teeth will not produce a cutting edge tangential to the cutter periphery. This lack of tangency causes the cutting edge to engage a work surface at varying depths and, therefore, does not produce a smooth surface finish. In a roughing cutter of the invention, the crests of the teeth are cut at an angle so as to compensate for the angular flutes, whereby the cutting edges are tangential to the periphery of the cutter.

A roughing cutter of the invention is not only advantageous with respect to its performance but is also capable of being manufactured in one operation performed on a fluted shank by a specially designed milling cutter. Such a milling cutter has a cutting edge adapted to simultaneously form the crests of the teeth at the proper angle and machine the grooves therebetween. Hence, there is no need to first cut the grooves and then grind the surfaces of the teeth in a separate operation, as is the case with present roughing cutters which have straight crested teeth.

Accordingly, it is a primary object of the invention to provide a roughing cutter capable of removing stock material while producing a relatively smooth surface finish.

Another object is to provide a roughing cutter having straight crested, radially relieved teeth with tangential cutting edges.

A further object is to provide a method for making a roughing cutter having straight crested, radially relieved teeth with tangential cutting edges.

These and other objects and advantages of the invention will become more readily apparent from the following detailed description, when taken in concert with the accompanying drawings, in which:

BRIEF DESCRIPTION OF THE DRAWINGS

FIG. 7 is an exaggerated view of the cutting edge of a tooth as it would appear looking along line 7—7 of FIG. 1.

FIG. 8 is a top view of the tooth of FIG. 7, taken along the line 8—8 of FIG. 7.

FIG. 9 is a side view of the tooth, taken along the line 9—9 of FIG. 7.

FIG. 10 is a front elevational schematic view of a milling cutter, illustrating the computation of the slope of the cutting edge thereof.

DETAILED DESCRIPTION OF PREFERRED EMBODIMENTS

Figure 1:
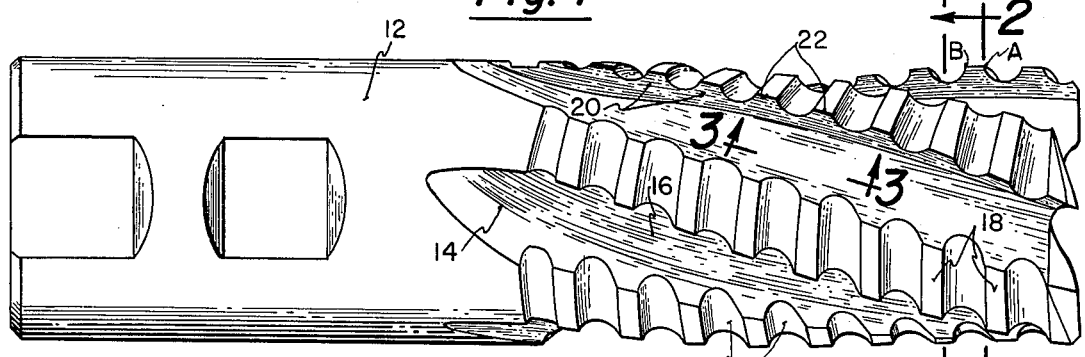
FIG. 1 is a side elevational view of an end mill according to the invention.
Figure 2:
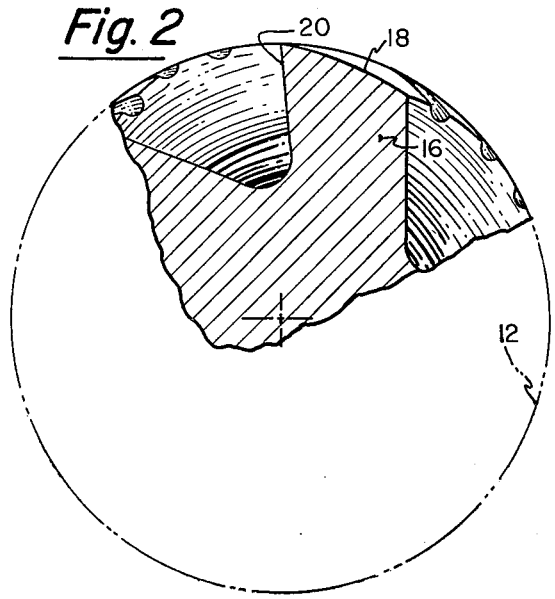
FIG. 2 is a transverse sectional view of the end mill of FIG. 1, taken along the line 2—2 thereof.
Figure 3:
FIG. 3 is a view of adjacent cutting faces on a land, taken generally along the line 3—3 of FIG. 1.
Figure 5:
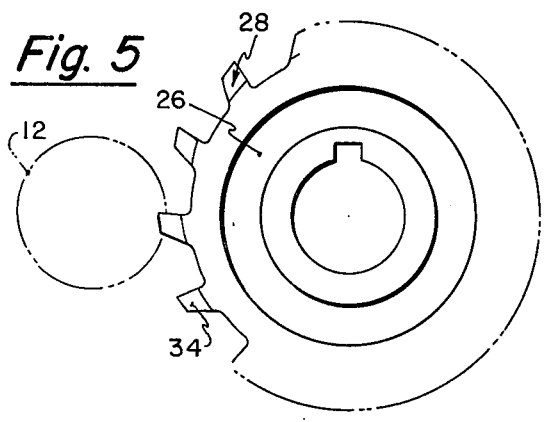
FIG. 5 is side elevational view of the milling cutter of FIG. 4 machining a fluted shank, outlined in phantom.

Referring to FIGS. 1, 2 and 3, there is shown a roughing cutter of the invention in the form of an end mill. The end mill comprises a generally cylindrical shank 12 having a plurality of angular flutes 14 which define and separate a plurality of lands 16. The flutes 14 depicted in FIG. 1 are actually helical and disposed so as to form a 20° helix angle. Upon each of the lands 16 are fashioned a series of straight crested, radially relieved teeth 18 with cutting faces 20 and cutting edges 22 at their advancing ends. Grooves 24 serve to separate the adjacent teeth on a land. From FIG. 2, the radial relief and positive rake angle of the teeth 18 may be appreciated.

While, at first glance, the end mill of FIG. 1 may appear conventional, a closer examination will reveal that some of the cutting edges appear horizontal. For example, taking the second tooth from the right end of the tool on the uppermost land in which the leading point of the cutting edge is designated A and the trailing point of the cutting edge is designated B, the cutting edge 22 between A and B appears horizontal (assuming, of course, the axis of the tool is horizontal). In addition, from FIG. 2, it will be seen that this tooth has its cutting edge in intersecting relationship with a vertical radial line drawn from the axis of the end mill. From FIG. 1, it may also be appreciated that the teeth are provided with a lead angle such that the cutting edges 22 on successive lands are axially staggered, as is customary with roughing cutters.

Figure 4:
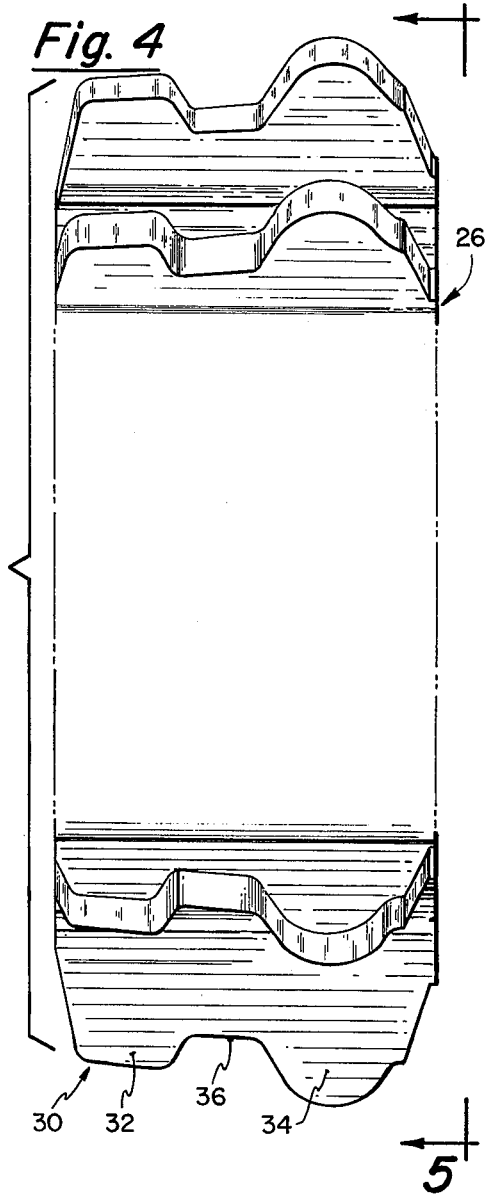
FIG. 4 is a front elevational fragmentary view of a milling cutter adapted to form the teeth and grooves of the end mill shown in FIG. 1.

Turning now to FIGS. 3 and 4, there is illustrated a milling cutter 26 adapted to produce a cutting tool of the invention. The cutter 26 has a plurality of circumferentially spaced teeth 28 which are relieved behind the cutting edge 30. As is best shown by the lowermost tooth in FIG. 4, the cutting edge 30 comprises two segments which respectively define two projections 32 and 34 which have a radial depth greater than the straight cutting edge segment 36 formed therebetween and are adapted to machine the grooves. It will be noted that the projection 32, which has a lesser radial depth than projection 34, is adapted to make an initial cut whereas projection 34 is adapted to make a finishing cut. From FIG. 4, it can be seen that the cutting edge segment 36 is straight and is inclined toward the axis of rotation of the cutter 26. It is the cutting edge segments 36 on the respective teeth 28 which form the crests of the teeth 18 of the end mill such that the cutting edges 22 of the end mill are tangential thereto.

Figure 6:
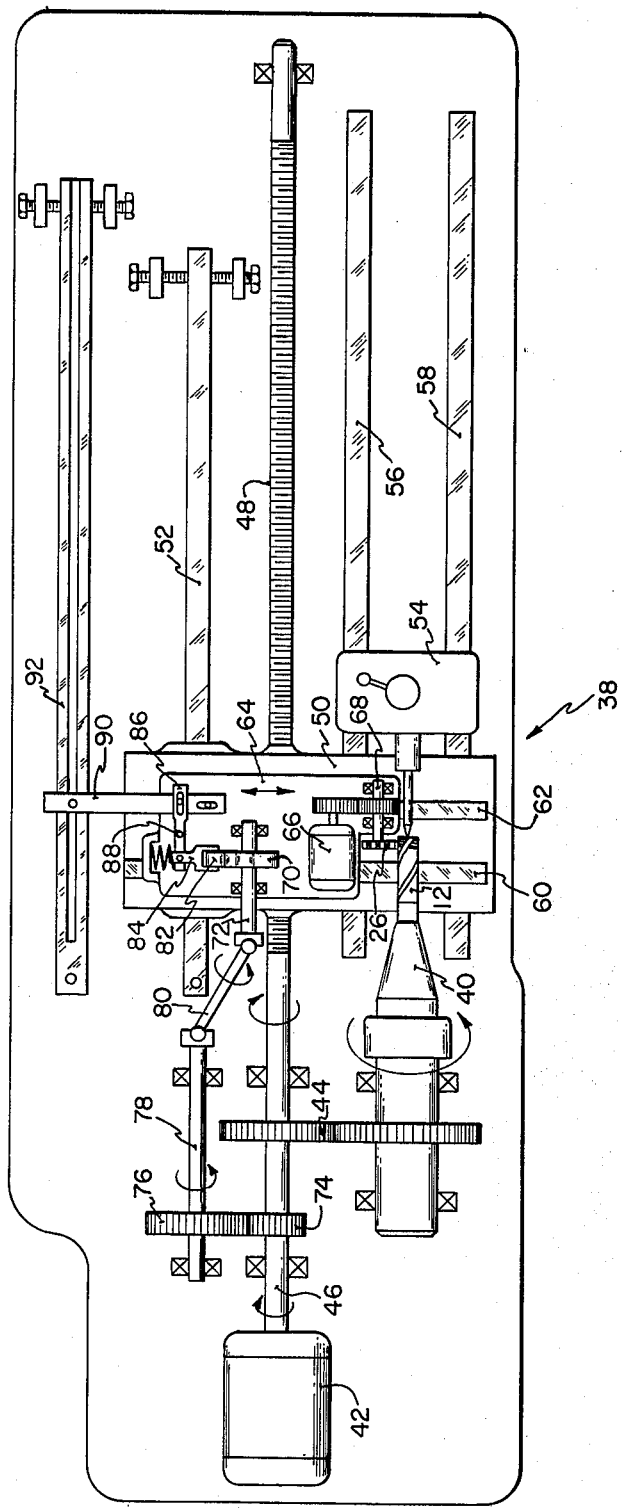
FIG. 6 is a top plan schematic view of a prior art thread milling machine adapted to machine the end mill of FIG. 1.

In order to more fully appreciate the preferred method of making a roughing cutter of the invention, reference should be had to FIG. 6, wherein a schematic view of a prior art relieving thread milling machine 38 is presented. The milling machine 38 is adapted to produce relative axial movement between the fluted roughing cutter workpiece and the milling cutter 36 for providing the selected lead between the end mill teeth and to produce relative transverse movement between the workpiece and the milling cutter 26 for radially relieving the form of the teeth. It will be understood, of course, that a roughing cutter of the invention may be made by a machine different from that described hereinafter, such a machine being shown merely to illustrate the method of the invention.

The fluted shank or workpiece 12 is secured in a spindle 40 for rotation therein. The spindle 40 is driven by a motor 42 via a gear 44 carried by the drive shaft 46 thereof. The drive shaft 46 is also in driving connection with a lead screw 48 for axially advancing the position of a main carriage 50 toward the left. The lead screw 48 is, of course, provided with a suitable lead nut (not shown) in engagement with the lead screw 48. The main carriage 50 is supported for sliding movement upon a way 52. A tailstock 54 is mounted upon ways 56 and 58 for movement thereover and is adapted to support the end of a workpiece in the usual manner.

Carried upon ways 60 and 62, which are mounted on the main carriage 50, is a carriage 64 which serves to mount the milling cutter 26. As shown in FIG. 6, the carriage 64 is movable in direction transverse to the direction of movement of the main carriage 50. The milling cutter 26 is rotated about an axis of rotation generally parallel to that of the workpiece 12 by means of a motor 66 in driving connection with a shaft 68 upon which the cutter 26 is mounted. It will therefore be appreciated that the lead angle of the teeth fashioned upon the workpiece 12 is a function of both the RPM of the lead screw 48 and the RPM of the spindle 40.

In order to furnish radial relief, it is necessary to move the cutter 26 transversely of the workpiece 12. To this end, a cam member 70, mounted for rotation on a shaft 72, is provided atop the carriage 64. It is to be understood that the cam member 70 is shaped to reflect the number of flutes 14, the width of the lands 16 and the desired depth of the radial relief. The cam member 70 is driven by the motor 42 via gears 74 and 76 and shafts 78 and 80. Rotation of the cam member 70 displaces a follower 82 mounted upon a spring loaded yoke 84 connected to the left end of link 86 which pivots about a fixed pin 88 connected to the slide 64. The right end of the link 86 is pivotally connected to a pin fixed upon a rod 90 which, in turn, is slidably engaged with a taper bar 92. The rod 90 is also connected at its lower end to a pin 94 mounted on the carriage 64 such that the carriage may move relative to the rod 90 along the ways 60 and 62.

As the cam member 70 rotates, the motion imparted to the link 86 by displacement of the yoke 84, is transmitted to the carriage 64 through the pin 88. Reaward movement (away from the workpiece 12) of the carriage 64 is then urged by the cam member 70 and forward movement of the carriage 64 is urged by the spring load on the yoke 84. In operation, the cutter advances into the workpiece 12 as the trailing edge of a flute is approached and continues to advance forwardly until the leading edge of the succeeding flute is traversed. Thereafter, the cutter 26 moves rearwardly and then again begins its forward movement so as to begin cutting anew at the trailing edge of the succeeding flute. This reciprocating movement of the slide 64 is common to many existing relieving thread milling machines.

The problem now is to determine the angle $\alpha$ of the cutting edge segment 36 which will yield the desired tangential cutting edge 22 on the roughing cutter, when given the tooth width W, flute angle $\beta$ and radial relief function. Those skilled in the art will appreciate that angle $\alpha$ can be determined experimentally or with the utilization of a shadow graph. However, it is also possible to at least approximately determine the angle $\alpha$ analytically as set forth hereinafter.

FIGS. 7, 8 and 9 show exaggerated views of a cutting edge 22. When looking axially down the shank 12 along the line 7—7, the cutting edge 22 would appear as shown by the solid line in FIG. 7. Shown in phantom and dashed lines, respectively, are cutting edges which would be produced by the straight cutting edge segment 36 when $\alpha$ equals zero for the cases of no radial relief, and radial relief. From FIG. 7, it will be seen that progressively less material must be removed by the cutting edge segment 36, in advancing from point A to point B, if the cutting edge 22 is to be tangential as shown. Hence, the left most portion of the cutting edge segment 36 must be of a lesser radial distance from the axis of the milling cutter 26 by an amount equal to the sum of the distance $d_1$ and $d_2$ of FIG. 7. It should be noted in this regard that the distance $d_1$ is the amount of radially inward movement of the cutter 26 from point A to a point where it begins to cut the point B and that the distance $d_2$ represents the radial depth of the additional material which is not to be removed. It should be obvious that the angle $\alpha$ of FIG. 10 can be ascertained by the following expression:

$$\mathrm{Tan}\alpha = \frac{d_1+d_2}{W}$$

The projected length of the cutting edge 22 projected on plane 7—7 can be easily found because the tooth width W is known and the flute angle is known. Therefore, the angle can be computed by use of the following equation:

$$\alpha = \mathrm{arc\ tan}\left[\frac{d_1 + \sqrt{R^2+ W^2\tan^2\beta - R}}{W}\right]$$

wherein:
 $\alpha$ is the slope of cutting edge segment 36 with respect to the axis of the milling cutter;
 $d_1$ is the amount of radially inward movement of the milling cutter 26 occasioned during machining of the cutting edge 22;
 R is the radial distance of the leading point of the cutting edge 22 from the axis of the workpiece 12;
 W is the width of a tooth measured in the axial direction; and
 $\beta$ is the helix angle of the flutes 14.

It will be understood that many modifications and variations are possible in light of the above teachings without departing from the scope and spirit of the invention as set forth in the appended claims.

I claim:

1. A roughing cutter comprising: a generally cylindrical shank having a plurality of lands and angular flutes separating the lands, a plurality of straight-crested cutting teeth formed on each of the lands with selected lead angle formed between the teeth of adjacent lands, each tooth having radial relief and a cutting face at its advancing end with a leading point and a trailing point, each cutting face having a straight cutting edge defined between the leading and trailing points such that the cutting edge of each tooth is substantially perpendicular to a radial line from the axis of the shank to the leading point thereto.

2. A method of making a roughing cutter having straight-crested, radially relieved teeth with tangential cutting edges comprising:

provoding a shank having lands and angular flutes separating the lands;

providing a milling cutter with a cutting edge having a straight segment which forms an angle with the axis thereof for machining the crests of the teeth and at least one segment which defines a projection for simultaneously machining the grooves between the teeth;

rotating the shank about its axis rotating the milling cutter about an axis of rotation generally parallel to the axis of the shank; and bidirectionally moving the milling cutter transversely of the shank during the rotating of the shank and the milling cutter in order to cut the teeth while simultaneously changing the relative axial positions of the milling cutter and the shank so that the teeth on successive lands may be staggered.

* * * * *